March 1, 1960 W. V. WOLFE ET AL 2,927,154

FILM-TELEVISION EDITING SYSTEM AND METHOD

Filed July 6, 1955

INVENTORS.

Wallace V. Wolfe &

Thomas C. Sharp

BY Val R. Goolaw

ATTORNEY.

2,927,154
Patented Mar. 1, 1960

2,927,154

FILM-TELEVISION EDITING SYSTEM AND METHOD

Wallace V. Wolfe, Encino, and Thomas C. Sharp, North Hollywood, Calif., assignors to Radio Corporation of America, a corporation of Delaware Application July 6, 1955, Serial No. 520,193
6 Claims. (Cl. 178—6.6)

Figure 1:
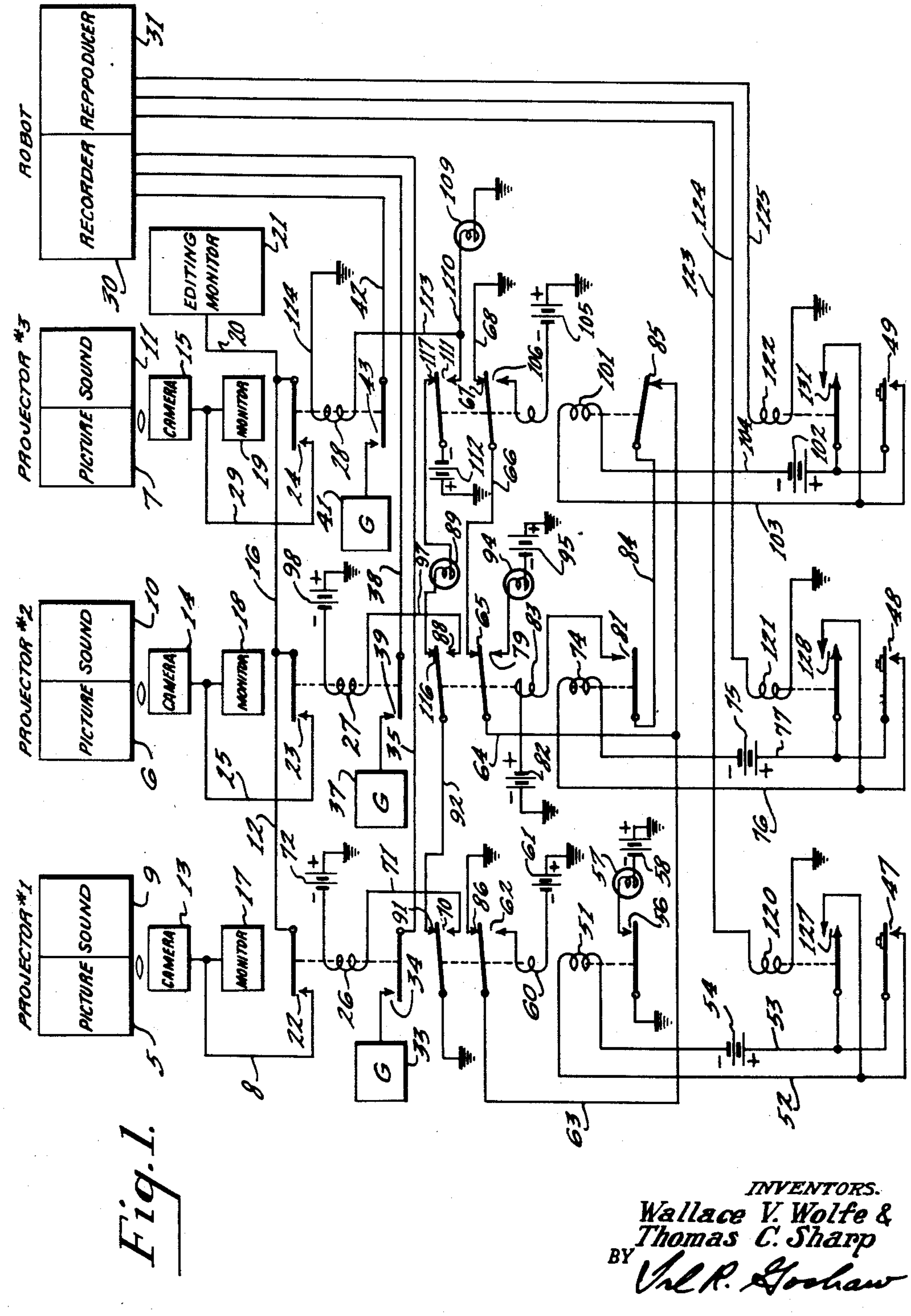

This invention relates to picture film and television equipment, and particularly to a combination thereof to permit the rapid editing of a plurality of motion picture films.

The present invention embodies several features which have been used in the production of motion picture films and in the production of television programs. One of the features is the reversal of a motion picture negative into a motion picture positive by television equipment to permit the observer to obtain a better evaluation of the qualities of the picture. This feature is disclosed in Blaney U.S. Patent No. 2,331,451 of October 12, 1954. Another feature involved in the present invention is a robot system whereby a record of the changes or variations made in a rehearsal procedure may permit the rehearsal procedure to be repeated with or without additional changes. This feature is disclosed and claimed in Wolfe U.S. Patent No. 2,279,018 of April 7, 1942. These features are combined in the present system along with other features which permit the rapid editing of a plurality of motion picture films.

The invention utilizes motion picture projectors in combination with television pickup cameras and receivers to exhibit before an editor several pictures in positive form taken simultaneously of the same scene or related scenes. Sections or sequences of the several films are selected during the observation and reproduced on the editor's monitor. To avoid printing a negative to a positive before observation, the television portion of the system is adjusted according to the above-identified Blaney patent to provide positive images for observation. To provide a record of what sections of the motion picture films have been selected, a control track robot unit similar to that disclosed and claimed in the above-mentioned Wolfe patent is used. This robot portion of the system permits the repetition of the original selection or "cutting" of the multiple negatives, and also permits changes to be made in the first selection during the repetition under control of the robot unit.

The principal object of the invention, therefore, is to facilitate the editing of a plurality of motion picture films.

Another object of the invention is to provide an improved method of and system for editing a plurality of motion picture films.

A further object of the invention is to provide an improved method of and system for editing motion picture films which permits a repetition of the original editing procedure.

A still further object of the invention is to provide an improved editing system for a plurality of motion picture films wherein the original editing of the films may be repeated and changes made during the repetition.

The novel features which are believed to be characteristic of this invention, both as to the manner of its organization and the mode of its operation, will be better understood from the following description when read in conjunction with the accompanying drawings, in which:

Fig. 1 is a combination schematic and diagrammatic view of an editing system embodying the invention.

Referring now to the drawing, three picture projectors of any suitable type, a continuous film type being preferred, are shown at 5, 6, and 7, with their accompanying sound reproducing sections 9, 10, and 11. It is to be understood that although three picture projectors have been illustrated, two or any number may be employed, three being used for purposes of illustration. The films used in the projectors 5, 6, and 7 may be films on which has been simultaneously photographed the same scene or related scenes from different angles and at different distances, the sound track for the scene being present on a separate film or at least on one of the picture films. The sound is reproduced within the hearing of the editor at the control console.

The three picture films, which may be negatives or positives, are projected on television cameras 13, 14, and 15 of any suitable type, such as RCA industrial TV cameras, and by the proper connections in the TV cameras, the negatives appear as positive images on respective monitor screens 17, 18, and 19. The positive images will appear as positives with the normal TV circuits.

In addition to the monitor TV receivers 17, 18, and 19, an editing monitor receiver 21 is provided, the pictures from projector 5 being transferred to monitor 21 over conductors 8, 12, 16, and 20 when contacts 22 are closed; the pictures from projector 6 being transferred to monitor 21 over conductors 25, 16, and 20 when contacts 23 are closed; and the pictures from projector 7 being impressed on monitor 21 over conductors 29 and 20 when the contacts 24 are closed. The three contacts 22, 23, and 24 are closed upon energization of respective relays 26, 27, and 28.

As mentioned above, a robot system forms a portion of the editing system and this portion includes a recorder 30, preferably magnetic, and a reproducer 31, preferably magnetic. The recorder records a control tone record or track at all times, the position of the track on the magnetic film indicating which particular film has its pictures being presented on the editing monitor 21. For instance, a generator 33 is connected over conductor 35 to the recorder 30 when contacts 34 are closed upon the energization of relay 26. Similarly, a generator 37 is connected to recorder 30 over conductor 38 when contacts 39 are closed upon the energization of relay 27. Also, a generator 41 is connected to recorder 30 over conductor 42 when contacts 43 are closed upon the energization of relay 28.

From the above description, it will be observed that when relay 26 is energized, closing contacts 22 and 34, the picture from projector 5 will be connected to the editing monitor 21, and simultaneously a control tone from the generator 33 will record a track at a certain position on a film in recorder 30. The recorder 30 is provided with three recording heads so as to record the three control tracks. With respect to the pictures from projector 6, the energization of relay 27 will impress the pictures on editing monitor 21 and simultaneously connect generator 37 to the recorder. The same action is obtained when relay 28 is energized, closing its contacts 24 and 43 to connect the pictures from projector 7 to monitor 21 and the generator 41 to the recorder 30. From the above, it will be observed that whichever picture film is being received on the editing monitor 21, a control tone record indicating this condition will be recorded. Although three separate generators 33, 37, and 41 have been illustrated, it is to be understood that a single generator may also be used. These generators may be of any suitable high frequency type or of the type disclosed in Pettus and Singer co-pending application, Ser. No. 525,556, filed August 1, 1955, now Patent No. 2,843,446, issued July 15, 1958, Blaney copending application, Ser. No. 525,555, filed August 1, 1955, now Patent No. 2,885,491, issued May 5, 1959, and Pettus and Singer co-pending application, Ser. No. 525,554, filed August 1, 1955, now abandoned.

Referring now to the remainder of the system, three momentary push-button switches 47, 48, and 49 control the connection of the respective TV cameras 13, 14, and 15 to the editing monitor 21. That is, as the three pictures are being viewed on monitors 17, 18, and 19, the editor may duplicate any one on monitor 21 by the use of respective switches 47, 48, and 49.

To obtain the picture from projector 5 on editing monitor 21, switch 47 is closed. The closing of the switch 47 energizes a relay 51 over conductors 52 and 53 and battery 54. The energization of relay 51 closes contacts 56 to energize a telltale lamp 57 over a battery 58 to indicate that relay 51 is energized. Since the push-button switch 47 is a momentary switch, a locking or holding circuit for the relay 51 is provided by a winding 60 and a circuit over battery 61, closed contacts 62, conductor 63, conductor 64, closed contacts 65, conductor 66, closed contacts 67, and conductor 68. Thus, the opening of switch 47 does not de-energize the relay 51 and it remains closed until its holding circuit is broken, as will be described hereinafter.

The energization of relay 51 not only closes its contacts 56 and 62 but also closes contacts 70 which energize relay 26 over closed contacts 70, conductor 71, and battery 72. Thus, the closing of switch 47 connects the TV camera 13 to the editing monitor 21 and connects the generator 33 to recorder 30 to record its control tone.

Now, should the editor wish to change the pictures on editing monitor 21 from those in projector 5 to those in projector 6, he pushes momentary switch 48 which energizes relay 74 over battery 75 and conductors 76 and 77. Upon energization of relay 74, it breaks contacts 65 which breaks the holding circuit for relay 51 traced above. The breaking of this circuit de-energizes lamp 57, disconnects the generator 33 from the recorder 30 and disconnects the camera 13 from the monitor 21. Simultaneously, contacts 81 of relay 74 are made which energizes a holding circuit for relay 74 over battery 82, coil 83, contacts 81, conductor 84, closed contacts 85, conductor 63, and closed contacts 86, since relay 51 has been de-energized. Also, relay 74 closes contacts 79 which energizes a telltale lamp 94 over battery 95, conductor 64, conductor 63, and closed contacts 86. This indicates that the relay 74 is energized.

Furthermore, the energization of relay 74 closes contacts 88 which energizes relay 27 over contacts 91, conductor 92, contacts 88, conductor 97, and battery 98. The energization of relay 27 closes its picture circuit contacts 23 and control tone circuit contacts 39. Thus, the picture projector 6 is connected to the editing monitor 21, and the generator 37 is connected to the recorder 30, while the telltale lamp 94 is energized to indicate that the picture from projector 6 is being received on the editing monitor 21.

Should the mixer next desire to impress the picture from projector 7 on the editing monitor 21, he pushes switch 49 which energizes relay 101 from battery 102 and over conductors 103 and 104. Energization of relay 101 opens contacts 85 breaking the holding circuit for relay 74 traced above. It also makes contacts 106, closing its holding circuit over battery 105, closed contacts 106, conductor 66, closed contacts 65, since relay 74 is now de-energized, conductor 64, conductor 63, and contacts 86. The energization of relay 101 energizes its telltale lamp 109 over conductor 110, closed contacts 111, and battery 112.

The closing of contact 111 also energizes relay 28 over battery 112, contacts 111, conductor 113, and conductor 114, to close its picture circuit contacts 24 and its control tone circuit contacts 43. Thus, the pictures from projector 7 are impressed on editing monitor 21 and the control tone from generator 41 is impressed on the recorder 30. As just described, as each camera-projector unit is switched to the editing monitor 21, the other camera-projector units are disconnected as well as their generators. The energization of relay 51 always breaks the holding circuits for relays 74 and 101, since their holding circuits are over contacts 86.

To indicate when none of the picture projectors are connected to the editing monitor 21, a telltale lamp 89 is provided, this lamp being energized only when contacts 91, contacts 116, and contacts 117 are closed. This requires the de-energization of all relays 51, 74, and 101, the energizing circuit for lamp 89 including battery 112 and closed contacts 91, 116, and 117, any one of which may be broken by respective energization of relays 51, 74, and 101.

As mentioned above, this editing system permits the repetition of any rehearsal by duplicating the manual operation of switches 47, 48, and 49. This is accomplished by taking the film from recorder 30 and reproducing it in reproducer 31. As the control tones are reproduced at mutually exclusive intervals, they will actuate respective relays 120, 121, and 122 over respective conductors 123, 124, and 125. Relays 120, 121, and 122 are special momentary contact relays, as shown by the double arrows. That is, these relays make momentary contact only upon energization and no contact when de-energized. Thus, they simulate the action of their respective push-button switches 47, 48, and 49 and continued energization of their windings will not hold the contacts closed.

The energization of relay 120 will momentarily close its contacts 127, which are in shunt across the switch 47, and accomplish the same result as the closing of switch 47. Similarly, the contacts 128 of relay 121 are in shunt to switch 48 and will accomplish the same result as the closing of switch 48. Relay 122 has contacts 131 which are in shunt to switch 49 and accomplish the same purpose as switch 49. Thus, as the control tones energize the respective relays, the same above-described circuit changes are made to repeat the rehearsal procedure.

If the editor desires to make any changes from the original "cutting" or editing of the three picture films, he may do so with the present system. For instance, should the control tone be energizing relay 120, and it is desired to select the pictures in projector 6 before the control tone to relay 121 does so, it is only necessary to actuate switch 48 and relay 74 will be energized to accomplish the switching action as described above. Similarly, the same changes may be made by pressing actuating switch 49. Since the control tone only causes its relay to make a momentary contact and no contact upon de-energization, the editor can take the control away from the robot at any time, the next control tone restoring the robot action. If the editor desires more of the pictures on projector 5, he need only push button 47 since contacts 128 are not made even if the relay 121 is being energized.

During this repetition under control of reproducer 31, a new control track film may be recorded in recorder 30 which will record the new rehearsal operation. Thus, at the end of a second rehearsal, the editor has not only a record of his first changes but a record of his second changes, and it may be that he prefers the first over the second. If it is desired to make more rehearsals, this same procedure may be followed until the desired cutting is to the liking of the editor. The various rehearsals may be recorded on separate films and each film may be erased and used over again, as is well known in magnetic recording practice, or the succeeding control tracks may be recorded on the same film as is accomplished with audio signals in Bradbury co-pending application, Serial No. 314,709, filed October 14, 1952, now Patent No. 2,733,301 of January 31, 1956. By the use of constant wavelength or noise generators, as referred to above in the co-pending applications, the picture projectors may be varied in speed without decreasing the effectiveness of the control tones. Furthermore, the generators may be of high frequency types wherein the change in speed of the film or consequent change in wavelength does not deleteriously affect the control tone.

After the final editing has been made, the length of each section or sequence is recorded and the original negatives or positives cut to correspond to the continuity obtained on editing monitor 21. The sections are spliced to be used in the normal manner.

We claim:

1. A film-television editing system comprising a plurality of film projectors, a similar plurality of television cameras adapted to reproduce images from said films simultaneously, a control tone recorder having a plurality of transversely positioned magnetic recording heads, means for generating a plurality of control tones to be recorded by said recorder at mutually exclusive times and in serial order, each of said generated control tones being impressible on a separate one of said heads, a television monitoring receiver adapted to receive pictures from any one of said cameras in serial order and at mutually exclusive times in synchronism with the respective generation of said control tones, switching means for manually switching from any one of said cameras to said monitor, said switching means including means to connect a respective one of said generating means to a corresponding recording head of said control tone recorder, and means for disconnecting the previously connected camera from said monitoring receiver when another of said cameras is connected to said monitoring receiver and to disconnect the previously connected generating means from its respective magnetic head.

2. A film-television editing system in accordance with claim 1 in which a control tone reproducer is provided together with means for actuating said switching means upon the reproduction of said control tones recorded by said control tone recorder.

3. A film-television editing system in accordance with claim 1 in which means are provided for indicating a selected film projector connected to said monitoring receiver and the absence of the connection of any projector to said monitoring receiver.

4. A film-television editing system in accordance with claim 2 in which means are provided for shifting control of said means for actuating said switching means from said control tone reproducer to said manual switching means.

5. The method of editing a plurality of picture films comprising reproducing said films for simultaneous observation, selecting sections from each of said films at mutually exclusive intervals for continuous observation of said sections in serial order, recording separate tone control records of said selections, each corresponding to a new selection and transversely disposed to the direction of recording in serial order, and repeating said selections under control of said records, said selections being manually variable while under control of said records.

6. A film editing system for a plurality of picture films comprising a plurality of means adapted to present the pictures on all of said films for simultaneous observation, means adapted to present selected sections of said picture films for observation in a serial order, circuit means for switching from any one of said first-mentioned means to said second-mentioned means during the simultaneous observation of all of said pictures, and means for making tone control records of said switching operations, said tone control records corresponding to said switching operations and record separately, said last-mentioned means including a control tone generator and a recorder therefor for making said records, means being provided for reproducing said records for repeating said switching operations, said circuit means including momentary contact relays adapted to be energized by said records and manually operable switches in shunt thereto for permitting variations in said original switching operations during the repetition thereof under control of said records.

References Cited in the file of this patent

UNITED STATES PATENTS

| | | |
|---|---|---|
| 2,272,043 | Browne | Feb. 3, 1942 |
| 2,279,018 | Wolfe | Apr. 7, 1942 |
| 2,615,088 | Gordon | Oct. 21, 1952 |
| 2,690,472 | Boucheron | Sept. 28, 1954 |
| 2,697,746 | Kennedy | Dec. 21, 1954 |
| 2,706,218 | Wootten | Apr. 15, 1955 |

FOREIGN PATENTS

| | | |
|---|---|---|
| 1,083,466 | France | Jan. 10, 1955 |

UNITED STATES PATENT OFFICE

CERTIFICATE OF CORRECTION

Patent No. 2,927,154 March 1, 1960

Wallace V. Wolfe et al.

It is hereby certified that error appears in the printed specification of the above numbered patent requiring correction and that the said Letters Patent should read as corrected below.

Column 6, line 26, for "record" read -- recorded --.

Signed and sealed this 23rd day of August 1960.

(SEAL)

Attest:

KARL H. AXLINE
Attesting Officer

ROBERT C. WATSON
Commissioner of Patents